United States Patent
Maynard et al.

(10) Patent No.: US 11,294,638 B2
(45) Date of Patent: Apr. 5, 2022

(54) QUANTUM RANDOM NUMBER GENERATOR

(71) Applicant: CRYPTA LABS LIMITED, Essex (GB)

(72) Inventors: Oliver Maynard, Essex (GB); Joe Hq Luong, Hertfordshire (GB)

(73) Assignee: CRYPTA LABS LIMITED, Essex (GB)

( * ) Notice: Subject to any disclaimer, the term of this patent is extended or adjusted under 35 U.S.C. 154(b) by 98 days.

(21) Appl. No.: 16/472,311

(22) PCT Filed: Dec. 19, 2017

(86) PCT No.: PCT/GB2017/000181
§ 371 (c)(1),
(2) Date: Jun. 21, 2019

(87) PCT Pub. No.: WO2018/115804
PCT Pub. Date: Jun. 28, 2018

(65) Prior Publication Data
US 2019/0377553 A1    Dec. 12, 2019

(30) Foreign Application Priority Data
Dec. 23, 2016 (GB) ..................... 1622132

(51) Int. Cl.
*G06F 7/58* (2006.01)
*H04L 9/08* (2006.01)

(52) U.S. Cl.
CPC ............ *G06F 7/588* (2013.01); *H04L 9/0852* (2013.01)

(58) Field of Classification Search
CPC ............................... G06F 7/588; H04L 9/0852
See application file for complete search history.

(56) References Cited

U.S. PATENT DOCUMENTS 6,249,009 B1   6/2001   Kim et al.
6,609,139 B1   8/2003   Dultz et al.
(Continued)

FOREIGN PATENT DOCUMENTS

CN   102760052 A   3/2012
CN   103930866 A   7/2014
(Continued)

OTHER PUBLICATIONS

United Kingdom Search Report, dated Jul. 12, 2017, Intellectual Property Office, United Kingdom.
(Continued)

*Primary Examiner* — Michael D. Yaary
(74) *Attorney, Agent, or Firm* — Steven M. Shape; Dennemeyer & Associates, LLC (57) ABSTRACT

A system for generating random numbers comprises a light source for emitting photons, an optical diffuser element, and a plurality of light detector elements, each being for converting received light into electrical charge. The system further comprises means for converting the electrical charge of each of the plurality of light detector elements into an output value. The light source is for illuminating the plurality of light detectors with the photons, whereby the photons are incident on random ones of the plurality of light detectors. The diffuser is located in a light path between the light source and the plurality of light detector elements, and is for making the degree of illumination of each of the plurality of light detector elements more uniform, whereby the output values of the plurality of light detector elements comprise a set of random numbers each comprising quantum noise.

20 Claims, 6 Drawing Sheets

(56) References Cited

U.S. PATENT DOCUMENTS

| | | | |
|---|---|---|---|
| 7,284,024 | B1 | 10/2007 | Alexel et al. |
| 2005/0071400 | A1 | 3/2005 | Ribordy et al. |
| 2006/0288062 | A1 | 12/2006 | Luo et al. |
| 2007/0260658 | A1 | 11/2007 | Fiorentino et al. |
| 2012/0221615 | A1 | 8/2012 | Cerf et al. |
| 2014/0016168 | A1 | 1/2014 | Marandi et al. |
| 2014/0287816 | A1 | 9/2014 | Homer |
| 2015/0089230 | A1 | 3/2015 | Niset et al. |
| 2015/0200778 | A1 | 6/2015 | Shi et al. |
| 2015/0193207 | A1* | 7/2015 | Pooser .................... G06F 7/588 708/255 |
| 2016/0259625 | A1 | 9/2016 | Scarlett |
| 2016/0328211 | A1* | 11/2016 | Nordholt ................ G06F 7/588 |
| 2016/0335054 | A1 | 11/2016 | Youn et al. |
| 2017/0010865 | A1* | 1/2017 | Sanguinetti ........... H04L 9/0852 |
| 2017/0308358 | A1* | 10/2017 | Haddad .................. G06F 7/588 |
| 2019/0243611 | A1* | 8/2019 | Martin ...................... G06F 7/58 |

FOREIGN PATENT DOCUMENTS

| | | |
|---|---|---|
| CN | 104270581 A | 1/2015 |
| CN | 104918243 A | 9/2015 |
| EP | 2940923 A1 | 11/2015 |
| GB | 2560873 B | 1/2020 |
| WO | 2012032353 A2 | 3/2012 |

OTHER PUBLICATIONS

Zhang X et al, "Portable true random number generator for personal encryption application based on smartphone camera", Electronics Letters, Nov. 20, 2014, vol. 50, No. 24, pp. 1841-1843, 2014, see figure 1.

Sanguinetti et al, "Quantum Random Number Generation on a Mobile Phone", Physical Review X 4, 031056, Sep. 29, 2014.

Wu Nan et al, "A novel quantum random number generation algorithm used by smartphone camera", Visual Communications and Image Processing, Jan. 20, 2004, San Jose, vol. 9500, May 21, 2015, pp. 95001H, XP060055219, DOI: 10.1117/12.2183338, ISBN: 978-1-62841-730-2, paragraph [0III]—paragraph [000V].

Bruno Sanguinetti et al, "Quantum Random Number Generation on a Mobile Phone", Physical Review X, vol. 4, No. 3, Sep. 1, 2014 XP055340442, DOI: 10.1103/PhysRevX.4.031056, paragraph [0111].

European Patent Office, International Search Report, dated Apr. 9, 2018, Rijswijk.

Search Report issued by the United Kingdom Intellectual Property Office in connection with Application No. GB1622132.7 dated Jul. 13, 2017.

Zhang X et al, "Portable true random number generator for personal encryption application based on smartphone camera", Electronics Letters, vol. 50, No. 24, pp. 1841-1843, 2014, see figure 1.

Sanguinetti et al, "Quantum Random Number Generation on a Mobile Phone", Physical Review X 4, 031056, 2014.

Office Action issued in connection with Chinese Application No. 201780078908.6 dated Sep. 2, 2020.

Search and Examination Report issued by the United Kingdom Intellectual Properrty Office issued in connection with Application No. GB 1913346.1 dated Oct. 9, 2019.

EPO Communication Pursuant to Rule 114(2) EPC issued in connection with EP Application No. 17837982.2 dated Dec. 12, 2020.

EPO Communication Pursuant to Article 94(3) issued in connection with Application No. EP 17837982.2 dated Nov. 23, 2020.

United Kingdom Examination Report issued in connection with Application No. GB1622132.7 dated Aug. 28, 2018.

United Kingdom Examination Report issued in connection with Application No. GB1913346.1 dated Jul. 29, 2020.

* cited by examiner

$$X \quad\quad\quad M \quad\quad\quad\quad\quad\quad Y$$

$$n\left\{\begin{bmatrix}0\\0\\1\\1\\1\\1\\0\\0\\0\\0\end{bmatrix} \cdot \left.\begin{bmatrix}0&1&1&1&0&0&1&1&1&1\\0&0&0&1&1&0&0&0&1&0\\0&1&0&1&0&0&1&0&0&1\\1&1&1&0&0&0&1&0&1&1\\0&0&1&1&0&1&0&0&0&0\end{bmatrix}\right\}\rho = \left.\begin{bmatrix}2\\2\\1\\1\\3\end{bmatrix}\right\}\rho \right.$$

$$\underbrace{\quad\quad\quad\quad\quad\quad\quad}_{n}$$

$$Y \quad\quad\quad Y_{\text{mod}} 2$$

$$\begin{bmatrix}2\\2\\1\\1\\3\end{bmatrix} \xrightarrow{\text{modulo 2}} \left.\begin{bmatrix}0\\0\\1\\1\\1\end{bmatrix}\right\}\rho$$

QUANTUM RANDOM NUMBER GENERATOR

CROSS-REFERENCE TO RELATED APPLICATIONS

This is a 35 U.S.C. 371 National Stage Patent Application of International Application No. PCT/GB2017/000181, filed Dec. 19, 2017, which claims priority to United Kingdom application 1622132.7, filed Dec. 23, 2016, each of which is hereby incorporated by reference in its entirety.

The present application relates to a system and method for generating quantum random numbers.

BACKGROUND

There a number of tasks for which random numbers are required. For example, cryptographic security generally depends upon the ability to generate high quality random numbers. Many conventional asymmetric key protocols require random numbers to generate keys, while one time pad protocols require strings of random numbers equal in length to the message to be encrypted. The effectiveness of such cryptographic security ultimately depends on the quality of the random numbers used.

High quality quantum random numbers are hard to produce, as they cannot be produced by any deterministic algorithm. Accordingly, it has been proposed to use physical processes having intrinsic randomness, such as quantum mechanical processes, to produce random numbers. However, such random number generators using quantum mechanical processes are generally relatively complex, and as a result are inconvenient and costly for use in a dynamic environment, such as encryption on mobile communication devices such as smartphones.

Accordingly, it is desirable to provide a quantum random number generator having reduced complexity and more suitable for use in a dynamic environment.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, the present disclosure provides a system for generating random numbers comprising: at least one light source for emitting photons; at least one optical diffuser element; a plurality of light detector elements, each for converting received light into electrical charge; and means for converting the electrical charge of each of the plurality of light detector elements into an output value; wherein the at least one light source is for illuminating the plurality of light detectors with the photons, whereby the photons are incident on random ones of the plurality of light detectors; and the at least one optical diffuser element is located in a light path between the at least one light source and the plurality of light detector elements, and is for making the degree of illumination of each of the plurality of light detector elements more uniform; whereby the output values of the plurality of light detector elements comprise a set of random numbers comprising quantum noise.

In a second aspect, the present disclosure provides a device adapted to co-operate with a mobile computing device comprising a sensor array to generate random numbers, the device comprising: attachment means for retaining the device in a predetermined position relative to the mobile computing device; means for directing light emitted by at least one light source to the sensor array; and at least one optical diffuser element; wherein the at least one optical diffuser element is located in a light path between the at least one light source and the sensor array, and is for making the degree of illumination of the sensor array more uniform; whereby the output of the sensor array comprises a set of random numbers comprising quantum noise.

In a third aspect, the present disclosure provides a method of generating random numbers comprising: emitting photons from at least one light source to illuminate a plurality of light detector elements with the photons, whereby the photons are incident on random ones of the plurality of light detectors; passing the emitted light through at least one optical diffuser element located in a light path between the at least one light source and the plurality of light detector elements and making the degree of illumination of each of the plurality of light detector elements more uniform; converting received light at each of the plurality of light detector elements into electrical charge; and converting the electrical charge of each of the plurality of light detector elements into an output value; whereby the output values of the plurality of light detector elements comprise a set of random numbers comprising quantum noise.

At least some parts of the methods described herein may be performed by software in machine readable form on a tangible storage medium e.g. in the form of a computer program comprising computer program code means adapted to perform some or all of the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
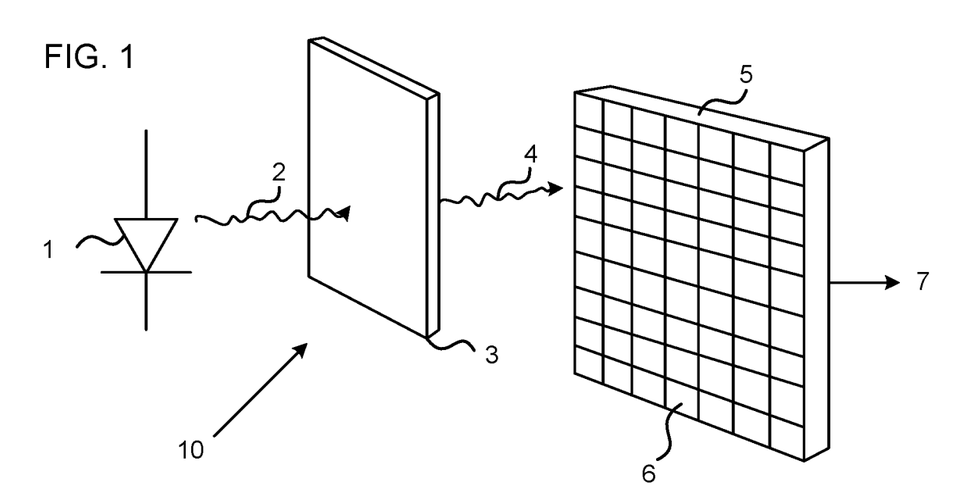
FIG. 1 is a schematic diagram of a system for generating random numbers according to a first embodiment of the present invention.

FIG. 1 illustrates a quantum random number generating system 10 according to a first embodiment of the present invention.

In FIG. 1, a light source 1 is arranged to emit light 2 with a known intensity. The light 2 emitted by the light source 1 comprises photons. In the illustrated first embodiment the light source 1 is a light emitting diode (LED) emitting light 2 with a known controlled intensity.

The light 2 emitted by the light source 1 is incident on an array 5 of photo-detector elements 6. The light source 1 and the array 5 are arranged so that the different photo-detector elements 6 of the array 5 are substantially evenly illuminated by the light 2 emitted by the light source 1.

The mean rate at which the light source 1 emits photons corresponds to the light flux emitted by the light source 1, or in other words the amount of illumination or amount of light energy it produces, and for an LED this is generally dependent on the electrical voltage used to drive the LED. Further, the mean rate at which the array 5 receives photons corresponds to the light flux of the incident light received at the array 5, which received light flux is related to the emitted light flux by the geometry of the light source 1 and the array 5 and any optical components in the light path between them, and by any light losses along the light path between the light source 1 and the array 5.

Provided that the photo-detector elements 6 of the array 5 are substantially evenly illuminated the mean rate at which each of the photo-detector elements 6 of the array 5 receives photons corresponds to the mean rate at which the array 5 receives photons multiplied by the proportion of the illuminated area of the array occupied by that photo-detector element 6. For arrays where the photo-detector elements 6 each have the same size and take up substantially all of the surface area of the array 5, the mean rate at which each of the photo-detector elements 6 of the array 5 receives photons corresponds to the mean rate at which the array 5 receives photons divided by the number of photo-detector elements 6 in the array 5.

However, the directions of emission of individual photons are random and uncorrelated. These directions of emission are the random result of quantum mechanical effects, so that which of the photo-detector elements 6 of the array 5 receives each individual photon is also the random result of quantum mechanical effects. Accordingly, this is a truly random, or quantum random, effect which cannot be predicted in any way.

A diffuser element 3 is located in between the light source 1 and the array 5, so that the light 2 emitted by the light source 1 passes through the diffuser element 3, and the resulting diffused light 4 is incident on the array 5 of photo-detector elements 6. In the illustrated first embodiment the array 5 is a CMOS camera sensor.

The diffuser 3 acts to make the light intensity of the illumination of the array 5 by the light source 1 more uniform. This makes the distribution of the individual photos emitted by the light source 1 across the illuminated surface of the array 5, and the distribution of the individual photons between the different photo-detector elements 6 of the array 5, more uniform. In the illustrated first embodiment the diffuser 5 is a diffuser film.

Figure 2:
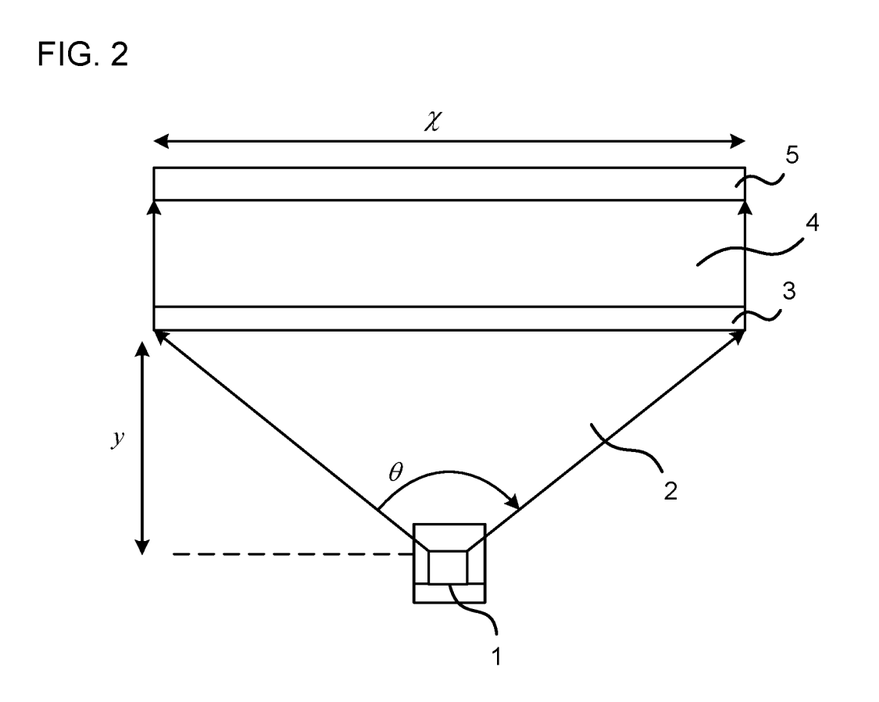
FIG. 2 is a side view of the system of FIG. 1.

FIG. 2 is an explanatory diagram illustrating the operation of the random number generating system 10, and in particular showing the operation of the diffuser 3. FIG. 2 shows a side view of the random number generating system 10.

Referring to FIG. 2, the light source 1 emits light 2 across an arc extending through an angle θ. The diffuser 3 has a width equal to or greater than a width of the array 5 and is aligned with the array 5 so that, from the point of view of the light 2 from the light source 1, all parts of the array 5 are covered by the diffuser 3. Where the array 5 has a maximum linear dimension x, in the width direction in the illustrated example, a separation y of the light source 1 from the diffuser 3 should be equal to or greater than a minimum value $y_{min}$ given by:

$$Y_{min} = x/2 \tan(\theta/2) \quad (1)$$

In the illustrated example shown in FIG. 2 the diffuser 3 has a width equal to the width of the array 5 and the separation y of the light source 1 from the diffuser 3 is equal to the minimum value $y_{min}$. In this example the light source 1 emits light 2 across an arc extending through an angle θ of 120°, the diffuser 3 and the array 5 have a width x of 11.1 mm, and the separation y of the light source 1 from the diffuser 3 is 3.38 mm.

Subject to the requirements set out above, it is generally desirable for the width of the diffuser 3 to and the separation of the light source 1 from the diffuser 3 to be as low as possible in order to minimize the size and weight of the random number generating system 10.

FIG. 2 shows a single side view of the random number generating system 10. It will be understood that the array 5 will also have a linear dimension in the breadth direction perpendicular to the width dimension shown in FIG. 2. In the illustrated first embodiment the array 5 is square and has the same linear dimension in the width direction and the perpendicular breadth direction. The diffuser 3 is also square and has substantially the same linear dimensions in the width and breadth directions as the array 5. Further, the light source 1 emits light in a range of directions having a square cross-section, so that the light 2 is emitted in a square pyramid shaped beam.

In an alternative example the array is substantially circular with the same linear dimension, the diameter, in the breadth and width directions, the diffuser is also circular and has substantially the same diameter as the array, and the light source emits light in a range of directions having a circular cross-section, so that the light is emitted in a circular cone shaped beam.

In other examples the array, diffuser and light beam may have other shapes, and may have different linear dimensions in the width and breadth directions.

In some examples the array, diffuser and light beam may have different shapes and/or dimensions from one another provided that the region of the diffuser illuminated by the light beam from the light source extends at least over an area corresponding to the entire area of the array. In some examples the diffuser may extend over an area greater than the region of the diffuser illuminated by the light beam, and/or greater than the area extent of the array. In one specific example, the array and diffuser may have a square or rectangular shape while the light is emitted in a circular beam.

In operation of the random number generating system 10, the light source 1 is driven to emit light with a selected light flux such that the photo-detector elements 6 of the array 5 are illuminated with a desired incident or received light intensity. The relationship between the light flux emitted by the light source 1 and the light intensity received at the array 5 will depend on the properties of the optical path between them, and in particular the optical properties of the diffuser 3. This is a known, fixed relationship.

The light source 1 is driven to emit light with a selected light flux by a controller of the random number generating system 10 driving the light source 1 with a corresponding drive voltage. The controller may be a microprocessor.

When the array 5 is illuminated by the light source 1 each light photon which is received by one of the photo-detector elements 6 of the array 5 generates an electrical charge, so that the cumulative charge associated with each photo-detector element 6 of the array 5 corresponds to the number of light photons which have been received by that one of the photo-detector elements 6 of the array 5 during an exposure time period, subject to some fluctuation or noise, which may arise from sources such as the amplifier and thermal fluctuations, for example. The relationship between the number of light photons received by a photo-detector elements 6 and the cumulative charge associated with that photo-detector element 6 depends upon the sensor amplification applied by that photo-detector element 6.

At the end of an exposure period the array 5 converts the electrical charge on each photo-detector element 24 to a corresponding digital value to generate a set of digital values in which each digital value corresponds to the total amount of electrical charge accumulated by a respective one of the photo-detector elements 6 of the array 5 during an exposure time period. The electrical charges may be converted into digital values by one or more analog to digital converters of the array 5.

Accordingly, each value of the generated set of digital values corresponds to the number of light photons which have been received by a respective one of the photo-detector elements 6 of the array 5 during a time period. As is explained above, which of the photo-detector elements 6 of the array 5 receives each individual photon is the random result of quantum mechanical effects. As a result, the number of photons received by each of the photo-detector elements 6 of the array 5 during an exposure time period contains both non-quantum technical noise and quantum noise (in other words, entropy having a quantum origin), so that the digital values are random numbers comprising quantum noise. These random numbers comprising quantum noise are referred to as raw quantum random numbers herein.

In the illustrated first embodiment the array 5 is a CMOS camera sensor and the time period is the exposure time of a single picture frame taken by the CMOS camera sensor.

Each time the CMOS camera sensor takes a single picture frame the array 5 generates a set of N-bit integer digital values as an output, where N is the bit depth of the camera sensor, or in other words, the bit depth of each pixel of the camera sensor. The number of digital values in the set of digital values is equal to the number of photo-detector elements 6 in the array 5.

Accordingly, subject to the use of suitable operating parameters as discussed below, each time the CMOS camera sensor takes a single picture frame the array 5 generates a set of raw quantum random numbers 7 as an output. The number of random numbers in the set of raw quantum random numbers is equal to the number of photo-detector elements 6 in the array 5, that is, the number of pixels of the CMOS camera sensor. The pixel values of a raw image output from the CMOS camera sensor may be used as the set of raw quantum random numbers.

The set of raw random numbers 7 generated by the array 5 as an output will comprise a set of N-bit values, where N is the bit depth of the camera sensor. These raw random numbers will be distributed about a mean value, with the distance of each raw random number value from the mean value being determined by random noise. For correct operating parameters, as discussed in more detail below, this random noise may be dominated by noise of quantum origin (i.e. photonic shot noise).

The set of raw random numbers 7 generated by the array 5 may be stored or output for subsequent use, or for further processing. In the illustrated embodiment the output set of raw random numbers 7 is stored in a buffer memory for subsequent processing by a post-processing system, as will be discussed in more detail below.

In operation, the light intensity incident on the array 5, the exposure time period and the sensor amplification applied to each photo-detector element 6 are set to values which maintain the photo-detector elements 6 in a linear response regime so that the amount of charge stored by each photo-detector element 6 substantially corresponds to the number of photons received by that photo-detector element 6, and the raw digital value output by each photo-detector element 6 corresponds to the number of photons received by that respective photo-detector element 6. Preferably, these parameters are set to values such that each time a photon is received by a respective photo-detector element 6 this results in a change in the digital value output by that photo-detector element 6. It will be understood that in addition to the charge corresponding to the number of photons received there will also be some fluctuation or noise having a non-quantum technical origin.

When the parameter values are set correctly so that the photo-detector elements 6 are in a linear response regime each photo-detector element 6 is able to store an amount of charge which substantially corresponds to the actual number of photons detected by that photo-detector element 6. Accordingly, in this linear response regime raw quantum random numbers can be produced because the elements are quantum noise dominated, i.e. the quantum random fluctuations in the number of photons received can be detected and converted into the raw quantum random numbers.

When the parameter values are set incorrectly so that the photo-detector elements 6 receive too low a light intensity and are not in a linear response regime the technical noise of the sensor elements will dominate the output numbers so that these will not comprise quantum random numbers.

When the parameter values are set incorrectly so that the photo-detector elements 6 receive too high a light intensity and are not in a linear response regime the sensor elements will saturate so that the output numbers so that these will not be dominated by quantum random noise.

In general, it is desirable to set the light intensity with which the photodetector elements 6 are illuminated as high as possible, subject to remaining within a linear response regime, in order to maximize the amount of quantum noise in the quantum random numbers output by the array 5 relative to the non-quantum technical or system noise.

As is explained above, the light intensity incident on the array 5 is controlled by the controller of the random number generating system 10. The exposure time period and the sensor amplification are also controlled by the controller. Accordingly, the photo-detector elements 6 can be maintained in a linear response regime by setting these parameters to appropriate values. In any specific implementation of the invention the necessary values can be determined in advance by suitable calculations and/or experimentation, and these values can be stored in, or provided to, the controller. In some examples a self-testing algorithm or procedure may be used to determine and set the right parameters for use for the array 5 and light source 1 to generate raw random numbers based on the results of test runs and/or measurements of system parameters and/or comparisons with intended baseline values. These parameters may for example include the sensor amplification and exposure time. The self-testing algorithm or procedure may be carried out by the controller.

The exposure time period and the sensor amplification correspond to the exposure time and ISO of the CMOS camera sensor, which may be readily controlled by the controller by using the normal control inputs of the CMOS camera sensor.

Accordingly, the random number generating system 10 can produce a set of raw quantum random numbers 7 after each image capture period or frame of the CMOS camera sensor, with each set of raw quantum random numbers 7 comprising a number of random numbers corresponding to the number of image pixels of the CMOS camera sensor, or to the number of image pixels used, which may be less than the total number of image pixels of the CMOS camera sensor. The set of raw quantum random numbers 7 may be read out serially or in parallel. The set of raw quantum random numbers 7 may be treated as a matrix of random numbers with matrix positions based on the pixel locations in the CMOS camera sensor generating each random number.

As is explained above, the raw quantum random numbers 7 contain quantum noise. In the illustrated example the raw quantum random numbers 7 are subjected to post-processing to generate pure quantum random numbers having one bit of quantum noise per bit.

The raw quantum random numbers 7 output from the random number generating system 10 are quantum random numbers containing quantum noise. However, because the raw quantum random numbers 7 have been generated based on the random number of photons received at different ones of the photo-detector elements 6, these raw quantum random numbers 7 will be distributed about a mean value, with the distance of each raw quantum random number value from the mean value being determined by random noise. This mean value may be regarded as a bias in the raw quantum number values, with the value of the bias being determined by the operating parameters of the random number generating system 10. For correct operating parameters, as discussed in more detail below, the random noise may be dominated by noise of quantum origin (i.e., photonic shot noise). Generally, the raw quantum random numbers 7 will have a Poisson distribution about a bias value corresponding to the mean number of photons detected by all of the photo-detector elements 6 of the array 5. Further, because the raw quantum random numbers 7 inevitably include a mixture of bias, quantum noise and non-quantum system noise the raw quantum random numbers 7 will have an entropy of less than 1, that is, less than one bit of entropy per bit. Further, the raw quantum random numbers 7 will have a predetermined bit length set by the bit depth of each pixel of the sensor. The raw quantum random numbers 7 generated by the array 5 as an output will comprise a set of N-bit values, where N is the bit depth of each pixel of the sensor.

In many applications for random numbers, such as some cryptographic functions, it is desirable, or essential, to have random numbers which are unbiased, and evenly distributed across a range of values. Further, in some applications it may be desirable, or essential, to have random numbers which have an entropy of 1. Further, it may be desirable, or essential, to have random numbers with a specific bit length, which may not be the same as the bit length of the raw random numbers 1.

Figure 8:
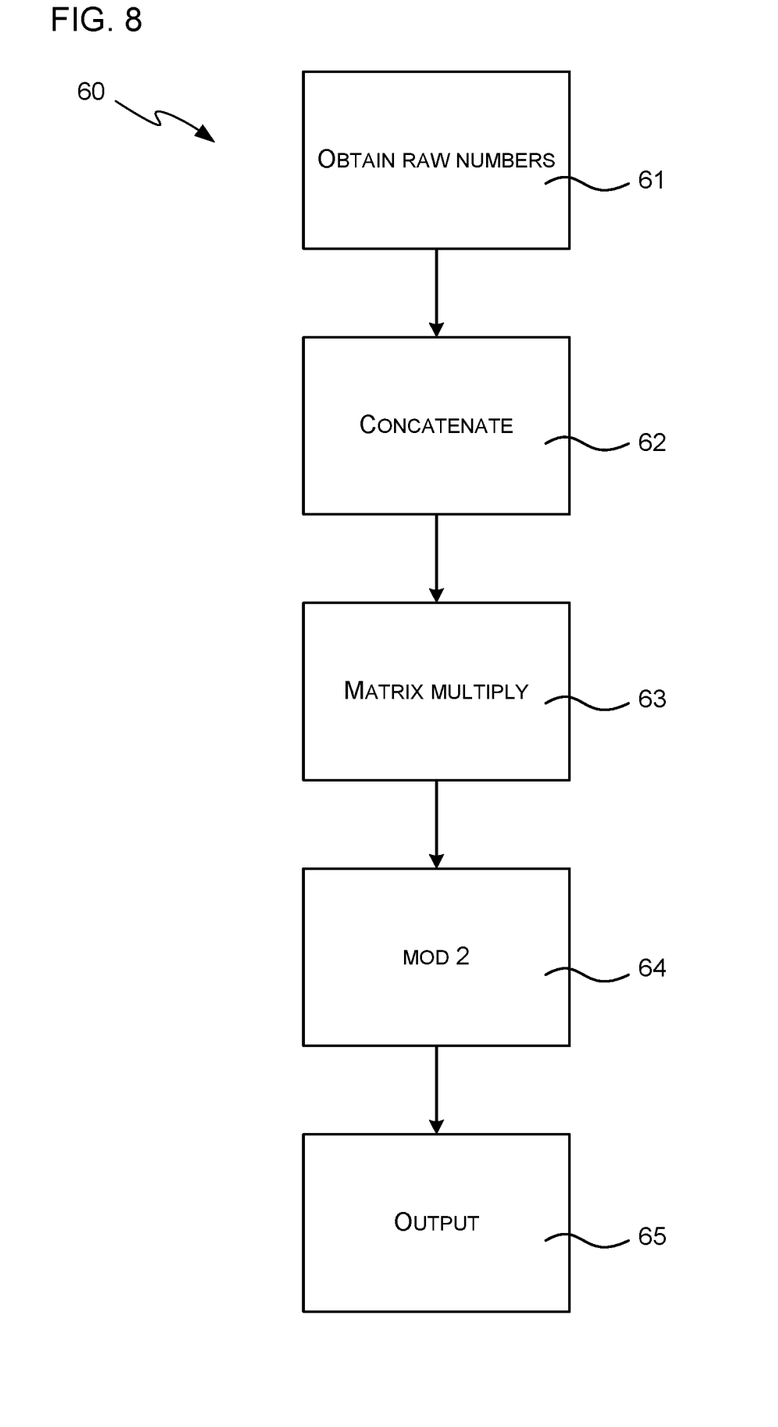
FIG. 8 is a flow chart of a post-processing of the generated random numbers.

In a post-processing method 60, first the raw quantum random numbers 7 are obtained in a block 61. In the illustrated embodiment the post-processing system obtains the raw quantum random numbers 7 by extracting them from the buffer memory.

Each of the raw quantum random numbers 7 has a digital length of a predetermined number of bits. Where the random number generating system 10 comprises a CMOS camera sensor, this digital length is the pixel depth of each of the camera pixels, for example 8 bits.

The raw quantum random numbers are then converted to a desired bit length by concatenating groups of the raw random numbers to form intermediate random numbers having the desired bit length in a block 62.

In one illustrative example where the raw quantum random numbers have a bit length of 8 and the desired bit length of the intermediate random numbers was 24 bits it would be necessary to concatenate 3 raw quantum random numbers to produce each intermediate random number, because 24/8=3. In this example, where three raw quantum random numbers with respective values of 15 (binary 00001111), 211 (binary 11010011) and 63 (binary (00111111) were concatenated the resulting intermediate random number would be binary 000011111101001100111111.

In another example where the raw quantum random numbers have a bit length of 8 and the desired bit length of the concatenated random numbers was 1024 bits it would be necessary to concatenate 128 raw quantum random numbers to produce each intermediate random number, because 1024/8=128.

The intermediate random numbers are then each subject to a matrix-vector multiplication process in a block 43. In this matrix-vector multiplication process the bit string X of each intermediate random number is subject to a matrix vector multiplication with a matrix M of random bits to produce an output string Y, where:

$$Y_i = \Sigma_{j=1}^{n} M_{ij} X_j \quad (1)$$

The matrix M of random bits may be obtained from a memory associated with the post-processing system, which may be used to store a number of suitable matrices. Such matrices of random bits can be readily calculated by known methods.

Each output string Y is then subject to a modulo 2 process to form a string Y mod 2 in a block 64.

Each string Y mod 2 is then output by the post-processing system as an output quantum random number in a block 65. The output quantum numbers may be supplied to a memory and stored for subsequent use.

The matrix M of random bits has equal numbers of one and zero values randomly distributed across the matrix, and as a result, the matrix-vector multiplication with the matrix M of random numbers and modulo 2 process produce output quantum random numbers which are evenly distributed, and specifically are not distributed about the mean value of the Poisson distribution.

Figure 9:
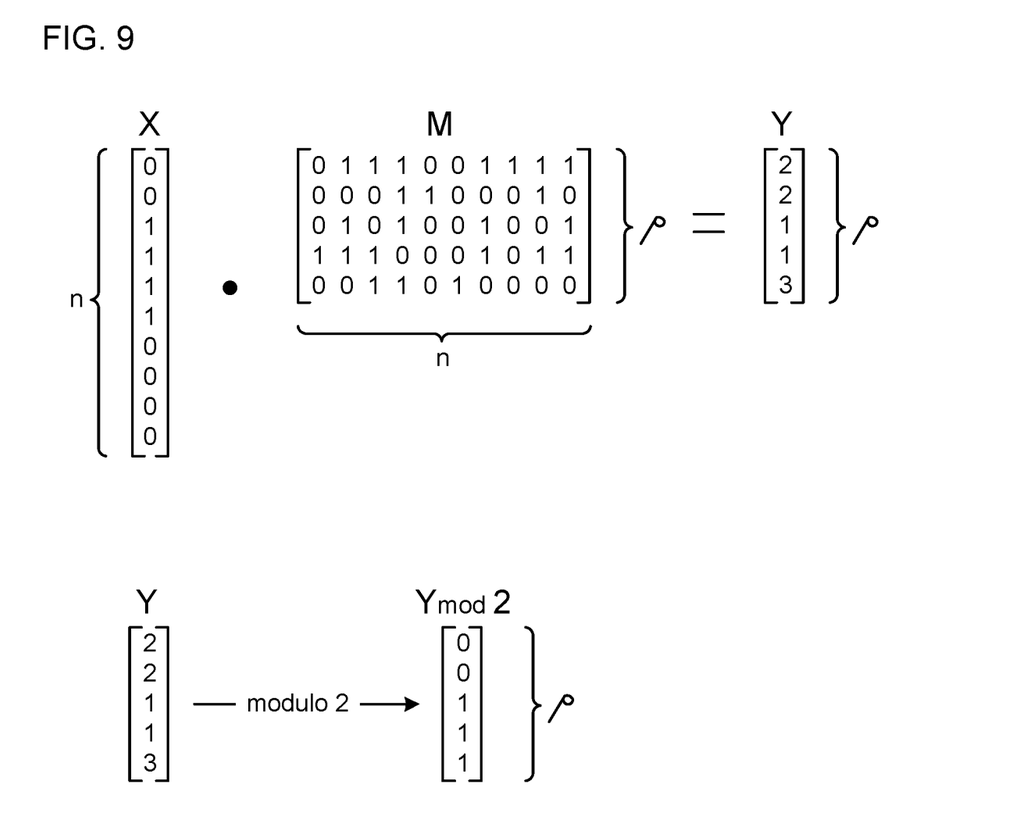
FIG. 9 is an illustrative example of a matrix vector multiplication process used in the post-processing.

The matrix-vector multiplication and modulo 2 processes of blocks 63 and 64 are shown in FIG. 9.

Where the output quantum random numbers each have a bit length of p, the output string Y of the matrix-vector multiplication process and the string Y mod 2 output by the modulo 2 process will both have this same bit length p. Accordingly, where the intermediate random numbers have a bit length of n, the matrix M of random bits must be a p by n matrix. This relationship is shown in FIG. 9.

In the illustrated example of FIG. 9 the p by n matrix M is a matrix having p rows by n columns and the intermediate random numbers are each arranged in a vector of n rows and 1 column, so that the output string Y has p rows and 1 column. In an alternative example the output string Y can be obtained by changing the order of the different factors, for example, the p by n matrix M is a matrix having n rows by p columns and the intermediate random numbers are each arranged in a vector of n columns and 1 row, so that the output string Y has p columns and 1 row.

If the raw quantum random numbers have an entropy per bit value E, in order for the output quantum random numbers to contain purely quantum noise the relationship between p and n must be that $p/n=E$.

In any specific implementation of the random number generating system 10 the entropy per bit value E corresponding to each set of possible suitable operating parameters of the array 5 can be calculated or determined by experimentation and stored. These values may conveniently be stored in a memory, for example in the form of a look-up table or tables.

Accordingly, when it is desired to produce output quantum random numbers having a particular bit length, for example where this bit length is required by a function using quantum random numbers, such as a security application, the system will know that this required bit length of the quantum random numbers to be produced is the required value of p.

The system can determine from the current or intended operating parameters of the array 5 what the entropy per bit value E of the raw random numbers 1 will be. The value of n which will be required in order to satisfy the relationship $p/n=E$ can then be readily calculated.

Once the required value of n has been calculated the required dimensions of the p by n matrix M, and the required degree of concatenation in order to convert the raw random numbers into the intermediate random numbers can be determined. A suitable p by n matrix M can then be obtained.

As a result, the produced output quantum random numbers can be arranged to be wholly quantum random numbers with an entropy per bit of 1, in addition to being unbiased and evenly distributed.

It will be understood that the values of p and n must be integer values so that it may not be possible to precisely satisfy the relationship $p/n=E$ for some values of E. In such cases, since the value of p is generally fixed by the desired bit length of the output quantum random numbers, it may be preferred to select the value of n to be the lowest (integer) value of n for which $p/n<E$.

Once the required value of n has been calculated the required dimensions of the p by n matrix M, the required degree of concatenation in order to convert the raw random numbers into the intermediate random numbers can be determined. A suitable p by n matrix M can then be obtained.

As a result, the produced output quantum random numbers can be arranged to be wholly quantum random numbers with an entropy per bit of 1, in addition to being unbiased and evenly distributed.

Further, in examples where n must be an integer multiple of the bit length of the raw random numbers in order to allow the intermediate numbers to be formed by concatenation, it may be preferred to select the value of n to be the lowest value of n satisfying this integer multiple requirement for which $p/n<E$.

In general, it is necessary that $p/n \leq E$ in order for the output quantum random numbers to have an entropy per bit of 1. Having p/n as near as possible to equaling E, for example by selecting n to be as low as possible, will produce the maximum output of output quantum random numbers from each set of raw random numbers 7.

The use of a buffer memory is not essential. However, providing a buffer memory to receive the set of raw random numbers 7 output from the random number generator 10, and then carrying out the post-processing on the random numbers stored in the buffer memory may simplify the post-processing.

In the example described above the output quantum random numbers are stored for subsequent use. In other examples they may instead be output for immediate use.

In the example described above the raw random numbers are concatenated to form the intermediate random numbers. In other examples alternative or additional processes may be used to convert a number of raw random numbers into intermediate random numbers In the embodiment described above light travels directly from the light source 1 to the array 5 through the single diffuser 3. In some examples multiple diffusers may be used to further improve the uniformity of the illumination of the array 5. Such multiple diffusers may be the same, or may be different from one another.

In some examples further optical components may be present to direct and control the light for uniform illumination of the array 5. In some examples the further optical components may include one or more attenuators and/or one or more spectral filters. The use of attenuators and/or spectral filters may assist in matching the emission characteristics of a light source to the desired illumination of an array. In some examples such further optical components may include light guides, mirrors, lenses, prisms and diffusers. This list is not intended to be exhaustive.

The embodiments described above use one or more LEDs as a light source. In some examples one or more lasers may be used as the light source. In other examples other light sources may be used. This list is not intended to be exhaustive.

In the embodiments described herein the whole of the array of sensor elements, or all pixels of the CMOS camera sensor, are uniformly illuminated and all of these sensor elements or pixels are used to generate quantum random numbers. In some alternative examples only a part or parts of the array, or some of the pixels, are uniformly illuminated. In such examples only the outputs from the uniformly illuminated sensor elements or pixels should be used as quantum random numbers. In a CMOS camera sensor the outputs from the pixels which are not uniformly illuminated can be excluded by gating or other straightforward selection methods. Similarly, any pixels known to be faulty may be excluded by gating or other straightforward selection methods.

It will be understood that not using some of the sensor elements or pixels reduces the output of the quantum random number generator in so far as this reduces the number of raw quantum random numbers produced by each exposure period or frame. However, in some examples it may not be convenient to uniformly illuminate the whole of the array or camera sensor, for example for geometric reasons. Further, in some examples it may be preferred to use only a part of the available array or camera sensor so that only a required number of quantum random numbers produced by each exposure period or frame, in order to avoid unnecessarily expending processing, and other, resources in generating extra quantum random numbers which are not required.

The embodiments described above use a CMOS camera sensor. In other examples other sensors able to detect individual photons may be used. In some examples a CCD camera sensor may be used.

Figure 3:
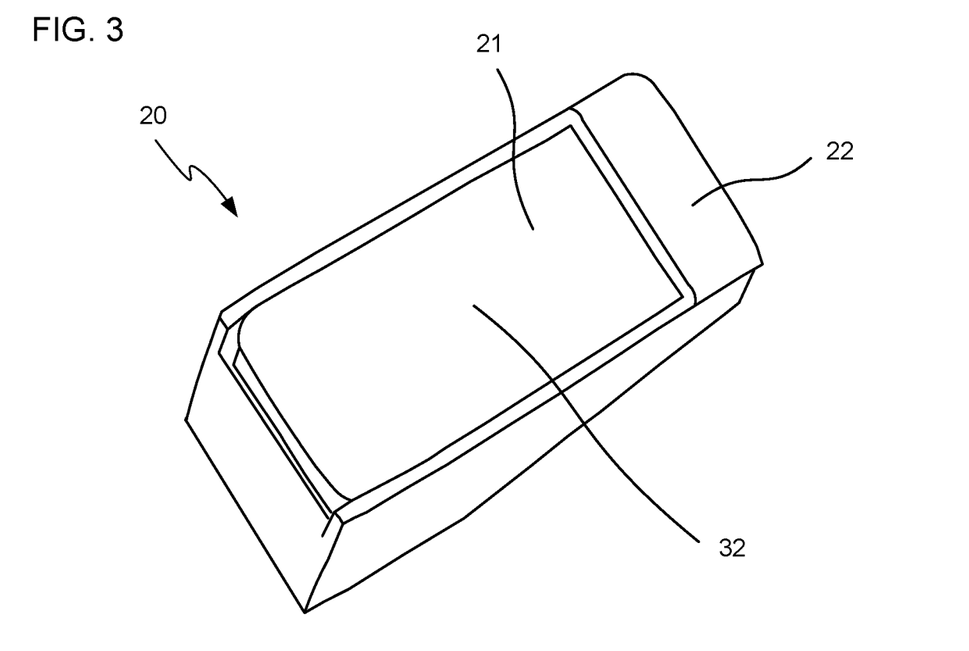
FIG. 3 is a schematic diagram of a system for generating random numbers according to a second embodiment of the present invention.
Figure 4:
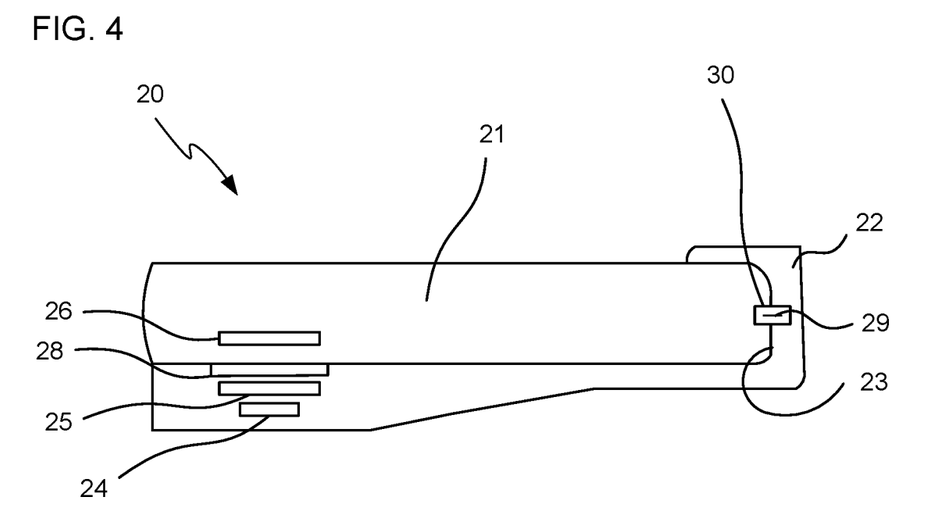
FIG. 4 is a sectional view of the system of FIG. 3.
Figure 5:
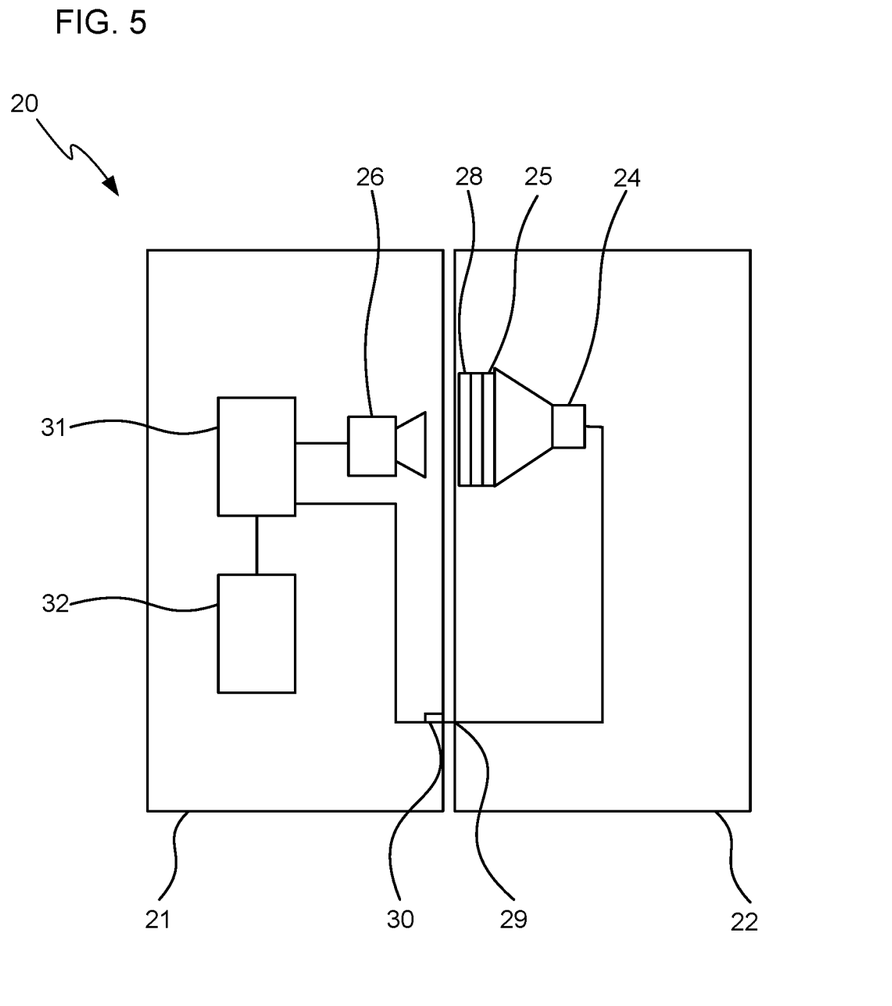
FIG. 5 is a diagrammatic view of components of the system of FIG. 3.

FIG. 3 illustrates a perspective view of a quantum random number generating system 20 according to a second embodiment of the present invention. FIG. 4 shows a sectional view through the quantum random number generating system 20 of FIG. 3. FIG. 5 shows a diagrammatic view of components of the quantum random number generating system 20 of FIG. 3.

In the illustrated second embodiment the quantum random number generating system 20 comprises a smartphone 21 together with a sleeve 22. The sleeve 22 comprises a recess 23 shaped and sized to receive the smartphone 21 and to maintain the sleeve 22 in a predetermined position relative to the smartphone 21.

An overview of the quantum random number generating system 20 according to the second embodiment is that this operates in a similar manner to the system of the first embodiment with a camera and processor of the smartphone 21 being used as the sensor array and controller, and with the light source and diffuser being comprised in the sleeve 22.

The sleeve 22 comprises an LED 24 and a diffuser 25. The LED 24 and the diffuser 25 are arranged in the sleeve 22 such that, when the smartphone 21 is correctly located in the recess 23 of the sleeve 22, the LED 24 and the diffuser 25 are adjacent a camera 26 of the smartphone 21 and are located relative to the camera so that the LED 24 and diffuser 25 can uniformly illuminate all, or a part of, a sensor array of the camera 26.

The diffuser 25 may be located behind a window 28 to protect the diffuser 25, LED 24 and any other internal parts of the sleeve 22 from physical damage or environmental effects. The protective window 28 may be substantially transparent at the frequency of the illumination light emitted by the LED 24. The window 28 may be omitted in some examples.

The sleeve 22 shields the camera 26 of the smartphone 21 from ambient light. If ambient light was received by the camera 26 it would be challenging to accurately control the amount and uniformity of the illumination of the sensor array of the camera 26.

The sleeve 22 further comprises an electrical connector 29 arranged in the sleeve 22 such that, when the smartphone 21 is correctly located in the recess 23 of the sleeve 22, the connector 29 is inserted into a corresponding electrical socket 30 of the smartphone 21. The connector 29 and socket 30 form an electrical connection between the smartphone 21 and the sleeve 22 so that the smartphone 21 can provide electrical power to the sleeve 22. This electrical connection may also be used to carry data and control signals between the smartphone 21 and sleeve 22.

The smartphone 21 further comprises a processor 31 and a user interface 32. The user interface 32 may be a graphical user interface (GUI) presented on a touchscreen of the smartphone 21 and/or an API to interface with third party applications and/or operating software. The sleeve 22 may be shaped to allow a user to view and interact with the user interface 32 when the smartphone 21 is located in the sleeve 22.

In the second embodiment it will be necessary to arrange the position of the LED 24 and the diffuser 25, or to add some further optical components, in order to take into account the location of the camera sensor of the camera 26 and ensure the required uniform illumination of the camera sensor. Further, where the camera 26 includes any optical elements such as lenses it may be necessary to arrange the position of the LED 24 and the diffuser 25, or to add some further optical components, in order to take into account the effect of these optical elements.

In operation, the quantum random number generating system 20 may be activated by software, for example an App, running on the processor 31 of the smartphone 21.

When the software requires random numbers, for example for supply to a cryptographic function or module of the App, the processor 31 switches on the camera of the smartphone 21, if this is not already switched on. Then, the processor 31 sends electrical power from the smartphone 21 to the sleeve 22 through the connector 29 and socket 30 to activate the LED 24 to illuminate the camera sensor of the camera 26 through the diffuser 25. As discussed above regarding the first embodiment, the processor 31 acting as the controller sets the intensity of the light emitted by the LED 24 and the exposure time and ISO operating values of the camera 26 so that the camera sensor of the camera 26 will operate in a linear regime.

Then, the processor 31 captures an image or frame using the camera sensor. This may be in the form of a raw image file. As is explained above, the camera output image values will comprise a set of raw quantum random numbers having a number equal to, or less than, the number of pixels of the camera sensor. These raw quantum random numbers can then be supplied to cryptographic functions or other modules on the smartphone 21 for use, stored for later use, or subjected to post-processing as described above.

In the second embodiment described above the sleeve 22 is supplied with electrical power by the smartphone 21. This is not essential. In other examples the sleeve 22 could have its own on board power supply, for example a battery.

In the second embodiment described above there is a physical electrical connection between the smartphone 21 and the sleeve 22. This is not essential. In other examples the smartphone 21 and the sleeve 22 could be connected wirelessly.

Figure 6:
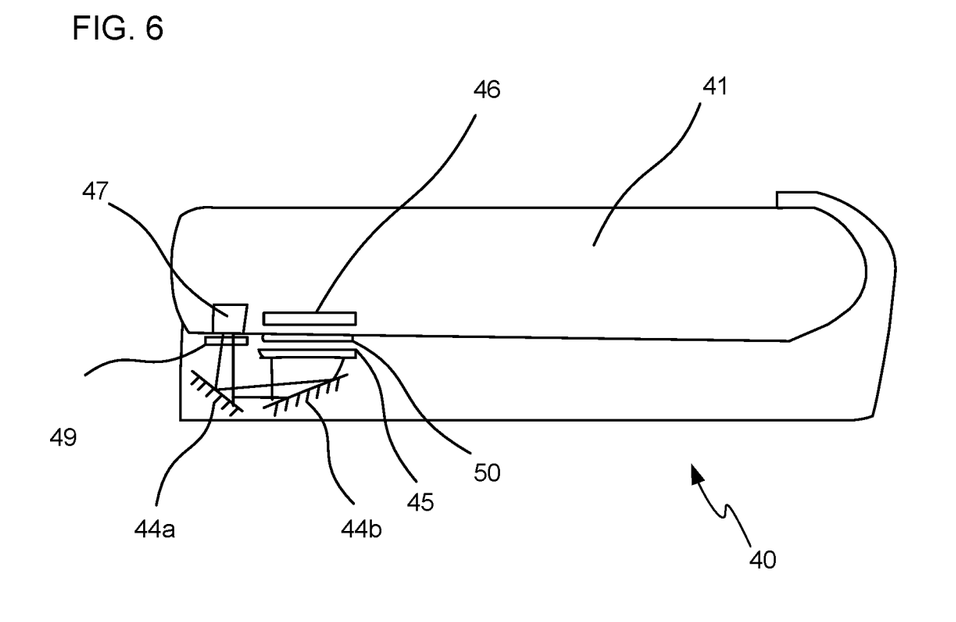
FIG. 6 is a sectional view of a system for generating random numbers according to a third embodiment of the present invention.
Figure 7:
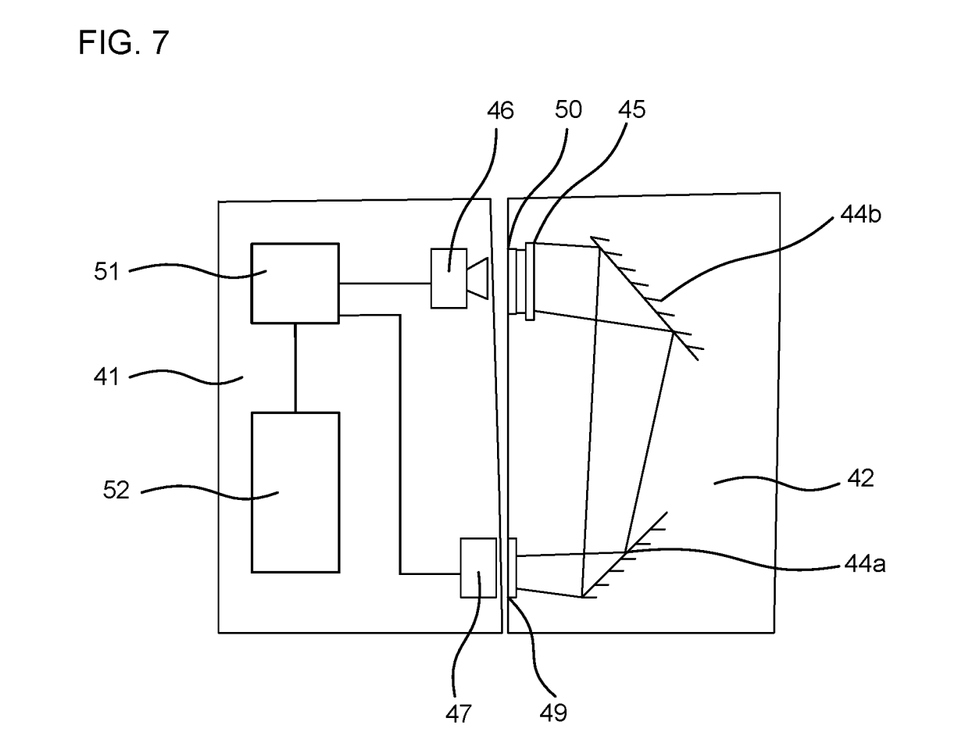
FIG. 7 is a diagrammatic view of components of the system of FIG. 6.

FIG. 6 illustrates a sectional view through a quantum random number generating system 40 according to a third embodiment of the present invention. FIG. 7 shows a diagrammatic view of components of the quantum random number generating system 40 of FIG. 6. The external appearance of the quantum random number generating system 40 of the third embodiment is similar to the quantum random number generating system 20 shown in FIG. 3.

In the illustrated third embodiment the quantum random number generating system 40 comprises a smartphone 41 together with a sleeve 42. Similarly to the second embodiment the sleeve 42 comprises a recess 43 shaped and sized to receive the smartphone 41 and to maintain the sleeve 42 in a predetermined position relative to the smartphone 41.

An overview of the quantum random number generating system 40 according to the third embodiment is that this operates in a similar manner to the system of the first embodiment with a camera and processor of the smartphone 41 being used as the sensor array and controller, with an electronic flash unit of the smartphone 41 being used as the light source, and with the diffuser being comprised in the sleeve 42.

The sleeve 42 comprises a pair of mirrors 44a and 44b and a diffuser 45. The pair of mirrors 44a and 44b and the diffuser 45 are arranged in the sleeve 42 such that, when the smartphone 41 is correctly located in the recess 43 of the sleeve 42, the mirrors 44a and 44b are arranged to direct light emitted by an electronic flash unit 47 of the smartphone 41 through the diffuser 45, and the diffuser 45 is located adjacent a camera 48 of the smartphone 41, and the mirrors 44a and 44b and diffuser 45 are located relative to the camera 48 so that the electronic flash unit 47 and diffuser 45 can uniformly illuminate a sensor array of the camera 48.

The diffuser 45 and mirrors 44a and 44b may be located behind respective windows 49 and 50 to protect the diffuser 45 and mirrors 44a and 44b, and any other internal parts of the sleeve 42 from physical damage or environmental effects. The protective windows 49 and 50 may be substantially transparent at the frequency of the illumination light emitted by the electronic flash unit 47. The windows 49 and 50 may be omitted in some examples.

The sleeve 42 shields the camera 46 of the smartphone 41 from ambient light. If ambient light was received by the camera 46 the amount and uniformity of the illumination of the sensor array of the camera 46 could not be accurately controlled.

The smartphone 41 further comprises a processor 51 and a user interface 52. The user interface 52 may be a graphical user interface (GUI) presented on a touchscreen of the smartphone 41. The sleeve 42 may be shaped to allow a user to view and interact with the user interface 52 when the smartphone 41 is located in the sleeve 42.

In the third embodiment it will be necessary to arrange the position of the mirrors 44a and 44b and the diffuser 45, or to add some further optical components, in order to direct light from the flash 47 to the camera 46 and to take into account the location of the camera sensor of the camera 46 and ensure the required uniform illumination of the camera sensor. Further, where the camera 46 includes any optical elements such as lenses it may be necessary to arrange the position of the mirrors 44a and 44b and the diffuser 25, or to add some further optical components, in order to take into account the effect of these optical elements.

Similarly to the second embodiment, in operation, the quantum random number generating system 40 may be activated by software, for example an App, running on the processor 51 of the smartphone 41. When the software requires random numbers, for example for supply to a cryptographic function or module on the smartphone 41, the processor 51 activates the flash 47 to illuminate the camera sensor of the camera 46 through the diffuser 45. As discussed above regarding the first embodiment, the processor 51 acting as the controller sets the intensity of the light emitted by the flash 47 and the exposure time and ISO operating values of the camera 46 so that the camera sensor of the camera 46 will operate in a linear regime.

Then, the processor 51 captures an image or frame using the camera sensor. This may be in the form of a raw image file. As is explained above, the camera output image values will comprise a set of raw quantum random numbers having a number equal to, or less than, the number of pixels of the camera sensor. These raw quantum random numbers can then be supplied to cryptographic functions or other modules on the smartphone 41 for use, stored for later use, or subjected to post-processing as described above.

An advantage of the third embodiment is that the sleeve 42 can be entirely passive and may not require any electrical connection to the smartphone 41.

The second and third embodiments described above refer to the use of a smartphone. In alternative examples other computing devices having a camera, and in some examples also having a flash, may be used.

The second and third embodiments described above refer to the use of a sleeve receiving a device such as a smartphone in a recess. In other examples the sleeve may be attached to the device in some other way. In some examples the sleeve may be replaced by a component clippable to the device.

The third embodiment described above uses a pair of mirrors to direct light emitted by the flash to the camera. In alternative examples one mirror, or more than two mirrors may be used.

The third embodiment described above uses mirrors to direct light emitted by the flash to the camera. In alternative examples other forms of reflective elements or components may be used.

The third embodiment described above uses mirrors to direct light emitted by the flash to the camera. In alternative examples other forms of light guide may be used.

The embodiments described above use a light source with a controlled intensity where the light flux emitted by the light source can be controlled. In other examples the intensity and/or light flux of the light source may not be controlled. In some examples it may not be viable to control the intensity of the light source. In such examples the operating parameters of the array may be set based upon the intensity of the light source in order to maintain the photo-detector elements of the array in a linear response regime. The operating parameters of the array may be based upon an already know intensity of the light source, or upon a measurement of the intensity of the light source.

In examples where the array is a camera sensor of a camera and the light source is a flash of the camera the intensity of the flash may be controlled by the camera settings. In such examples the operating parameters of the array may be set based upon the camera settings in order to maintain the photo-detector elements of the array in a linear response regime.

The embodiments described above describe all sensor elements, or all uniformly illuminated sensor elements of an array being used to generate quantum random numbers. In other examples only a subset of the sensor elements, or uniformly illuminated sensor elements, may be used to generate quantum random numbers. In some examples where the array is a colour sensor, such as a CMOS colour camera sensor, having different sensor elements responsive to different colours of incident light only sensor elements responsive to one or more specific colours may be selectively used to generate quantum random numbers.

The embodiments described above use a single light source. In other examples multiple light sources may be used. In particular, in examples where the array is a colour sensor, such as a CMOS colour camera sensor, having different sensor elements responsive to different colours of incident light a separate light source may be used corresponding to each colour. In one specific example where the array has different R, G and B sensor elements responsive to red, green and blue light, the light source may comprise three light sources which respectively emit red, green and blue light, such as red, green and blue LEDs.

The embodiments described above generate a set of quantum random numbers from a single exposure period of the sensor array. Where the array is a camera sensor the exposure period may be a frame or image captured by the camera. In some examples this frame, image or exposure period may be part of a sequence, such as a video sequence. In some examples a series of frames, images or exposure periods may be used to generate a series of sets of quantum random numbers from a sequence, such as a video sequence.

In the embodiments described above the matrix M of random bits is obtained from a memory. In other examples the matrix M of random bits may be obtained by calculating anew matrix each time the matrix vector multiplication is to be carried out. In some examples, one or more stored matrices M may be used repeatedly.

The embodiments described above use binary bits to encode the quantum random numbers. In other examples an alternative encoding basis may be used. In some examples the encoding may be changed from binary bits to another encoding during the generation of the quantum random numbers. In some examples where an alternative encoding is used before the modulo 2 operation is carried out, the modulo 2 operation may be replaced by an alternative operation matched to the alternative encoding.

In the illustrated embodiments some components may be integrated at a circuit, package or die level.

In the illustrated embodiments of the invention the quantum random number generating system may comprise a computing and/or electronic device.

Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A system for generating random numbers comprising:
   at least one light source for emitting photons;
   at least one optical diffuser element;
   a plurality of light detector elements, each for converting received light into electrical charge; and
   means for converting the electrical charge of each of the plurality of light detector elements into an output value;
   wherein the at least one light source is for illuminating the plurality of light detectors with the photons, whereby the photons are incident on random ones of the plurality of light detectors; and
   the at least one optical diffuser element is located in a light path between the at least one light source and the plurality of light detector elements so that, when light is emitted from the light source, the light enters the diffuser element through a first surface of the diffuser element, passes through the diffuser element, and exits the diffuser element from a second surface of the diffuser element opposed to the first surface, wherein the diffuser element is configured to make the degree of illumination of each of the plurality of light detector elements more uniform;
   whereby the output values of the plurality of light detector elements comprise a set of random numbers each comprising quantum noise.

2. The system according to claim 1, wherein each of the plurality of light detectors produces a separate random number comprising quantum noise.

3. The system according to claim 2 wherein the output value produced by alight detector corresponds to the number of photons incident on that light detector.

4. The system according to claim 1, wherein the at least one light source and the plurality of light detector elements are arranged such that the plurality of light detector elements respond linearly to the received light.

5. The system according to claim 1, wherein the plurality of light detector elements are comprised in an array.

6. The system according to claim 5, wherein the plurality of light detector elements are all or a sub-set of the light detector elements comprised in the array.

7. The system according to claim 1, wherein the at least one light source comprises one or more LEDs, or one or more lasers.

8. The system according to claim 5, wherein the array is a CMOS sensor or a CCD sensor.

9. The system according to claim 5, wherein the array is a camera sensor, and the at least one light source and the exposure time and ISO of the camera sensor are arranged such that the plurality of light detector elements respond linearly to received light.

10. The system according to claim 9, wherein the camera sensor is a camera of a mobile computing device.

11. The system according to claim 10, wherein the at least one light source is a flash of the mobile computing device.

12. The system according to claim 10, wherein the mobile computing device is a smartphone.

13. A device adapted to co-operate with a mobile computing device comprising a sensor array to generate random numbers, the device comprising:
  an attachment means for retaining the device in a predetermined position relative to the mobile computing device;
  means for directing light emitted by at least one light source to the sensor array; and at least one optical diffuser element;
  wherein the at least one optical diffuser element is located in a light path between the at least one light source and the sensor array so that, when light is emitted from the light source, the light enters the diffuser element through a first surface of the diffuser element, passes through the diffuser elements, and exits the diffuser element from a second surface of the diffuser element opposed to the first surface, wherein the diffuser element is configured to make the degree of illumination of the sensor array more uniform;
  whereby the output of the sensor array comprises a set of random numbers each comprising quantum noise.

14. The device according to claim 13 wherein the device further comprises the at least one light source.

15. A method of generating random numbers comprising:
  emitting photons from at least one light source to illuminate a plurality of light detector elements with the photons, whereby the photons are incident on random ones of the plurality of light detectors;
  passing the emitted light through at least one optical diffuser element located in a light path between the at least one light source and the plurality of light detector elements so that, when light is emitted from the light source, the light enters the diffuser element through a first surface of the diffuser element, passes through the diffuser element, and exits the diffuser element from a second surface of the diffuser element opposed to the first surface, and making the degree of illumination of each of the plurality of light detector elements more uniform;
  converting received light at each of the plurality of light detector elements into electrical charge; and
  converting the electrical charge of each of the plurality of light detector elements into an output value;
  whereby the output values of the plurality of light detector elements comprise a set of random numbers each comprising quantum noise.

16. The method according to claim 15, wherein each of the plurality of light detectors produces a separate random number comprising quantum noise.

17. The method according to claim 16, wherein the output value produced by a light detector corresponds to the number of photons incident on that light detector.

18. The method according to claim 15, and further comprising arranging the at least one light source and the plurality of light detector elements such that the plurality of light detector elements respond linearly to the received light.

19. The method according to claim 15, wherein the plurality of light detector elements are comprised in an array.

20. The method according to claim 19, wherein the array is a camera sensor, and the method further comprises arranging the at least one light source and the exposure time and ISO of the camera sensor such that the plurality of light detector elements respond linearly to received light.

* * * * *